US008087255B2

(12) United States Patent
Klimpel

(10) Patent No.: US 8,087,255 B2
(45) Date of Patent: Jan. 3, 2012

(54) AIR-CONDITIONING SYSTEM FOR AIRCRAFT

(75) Inventor: Frank Klimpel, Naherfurth in Kayhude (DE)

(73) Assignee: Airbus Deutschland GmbH, Hamburg (DE)

( * ) Notice: Subject to any disclaimer, the term of this patent is extended or adjusted under 35 U.S.C. 154(b) by 645 days.

(21) Appl. No.: 12/295,963

(22) PCT Filed: Apr. 5, 2007

(86) PCT No.: PCT/EP2007/003148
§ 371 (c)(1),
(2), (4) Date: Jan. 29, 2009

(87) PCT Pub. No.: WO2007/115811
PCT Pub. Date: Oct. 18, 2007

(65) Prior Publication Data
US 2009/0301110 A1 Dec. 10, 2009

(30) Foreign Application Priority Data
Apr. 7, 2006 (DE) .......................... 10 2006 016 541

(51) Int. Cl.
*F25D 17/06* (2006.01)

(52) U.S. Cl. ................................ 62/89; 62/244; 62/401

(58) Field of Classification Search .................... 62/767; 454/71, 76; 60/767, 782; 165/44, 235
See application file for complete search history.

(56) References Cited

U.S. PATENT DOCUMENTS

| 2,925,255 | A | | 2/1960 | Shaw |
| 2,961,939 | A | | 11/1960 | Typaldos |
| 3,965,673 | A | * | 6/1976 | Friedrich ........................ 60/788 |
| 4,283,924 | A | * | 8/1981 | Schutze ......................... 62/402 |
| 5,086,622 | A | | 2/1992 | Warner |
| 5,516,330 | A | * | 5/1996 | Dechow et al. ................. 454/74 |
| 5,906,111 | A | * | 5/1999 | Lui ................................ 62/402 |
| 6,050,103 | A | * | 4/2000 | Ko ................................. 62/401 |
| 6,189,324 | B1 | | 2/2001 | Williams et al. |
| 6,519,969 | B2 | * | 2/2003 | Sauterleute ..................... 62/401 |

(Continued)

FOREIGN PATENT DOCUMENTS

DE 10301465 8/2004

(Continued)

OTHER PUBLICATIONS

State Intellectual Property Office of People's Republic of China, Office Action (English language (5 pgs.)), May 13, 2011.

(Continued)

*Primary Examiner* — Mohammad Ali
(74) *Attorney, Agent, or Firm* — Wood, Herron & Evans, LLP

(57) ABSTRACT

Air-conditioning system (10) for aircraft, in particular for commercial aircraft, with a bleed air source (12), a bleed air line (22-30) comprising a main valve (16), and an air-conditioning unit (32), wherein a mass air flow conveyed from the bleed air source (12) through the bleed air line (22-30) to the air-conditioning unit (32) can be controlled by means of the main valve (16). According to the invention it is envisaged that a by-pass line (36-50, 58, 60) comprising a by-pass valve (34) and by-passing at least a part (22-26, 16) of the bleed air line, is present between the bleed air source (12) and the air-conditioning unit (32).

9 Claims, 3 Drawing Sheets

U.S. PATENT DOCUMENTS

| | | | |
|---|---|---|---|
| 6,658,873 B2 * | 12/2003 | Clarke et al. | 62/172 |
| 6,988,376 B2 | 1/2006 | Brutscher et al. | |
| 7,017,365 B2 * | 3/2006 | Haas et al. | 62/402 |
| 7,040,112 B2 * | 5/2006 | Axe et al. | 62/401 |
| 7,305,842 B1 * | 12/2007 | Schiff | 62/244 |
| 7,467,524 B2 * | 12/2008 | Brutscher et al. | 62/402 |
| 2005/0011217 A1 | 1/2005 | Brutscher et al. | |

FOREIGN PATENT DOCUMENTS

| | | |
|---|---|---|
| DE | 102004010366 | 9/2005 |
| DE | 102004038860 | 2/2006 |
| EP | 1439123 | 7/2004 |
| GB | 1083573 | 9/1967 |
| SU | 251281 | 8/1969 |
| SU | 302279 | 4/1971 |
| WO | 9924318 | 5/1999 |
| WO | 9932358 | 7/1999 |

OTHER PUBLICATIONS

International Search Reports, form Nos. PCT/ISA/220, PCT/ISA/210, an PCT/ISA/237.

Federal Service for Intellectual Property, Patents and Trademarks (Rospatent), Russian Patent Office, Decision on Granting, Form No. 01 IZ-2008 English language (4 pgs.), Mar. 1, 2011.

* cited by examiner

AIR-CONDITIONING SYSTEM FOR AIRCRAFT

This application claims the benefit of International Application No. PCT/EP2007/003148, filed on Apr. 5, 2007, and German Application No. DE 10 2006 016 541.1, filed on Apr. 7, 2006.

The present invention relates to an air-conditioning system for aircraft, in particular for commercial aircraft, with a bleed air source, a bleed air line comprising a main regulating valve, and an air-conditioning unit, wherein a mass air flow controllable via the main regulating valve is fed from the bleed air source via the bleed air line to the air-conditioning unit. The invention also relates to a method for the air conditioning of an aircraft, in particular a commercial aircraft, which comprises the following steps: providing a mass flow of bleed air; conducting of the mass flow of bleed air to an air-conditioning unit via a bleed air line.

On account of the nowadays customary flying heights and the environmental conditions prevailing at these heights—low air pressure, low temperature—air conditioning as well as a regulation of the air pressure in the aircraft interior and especially in the passenger compartment is absolutely essential. An air-conditioning system 10 for aircraft ("AGS=air generation system") according to the prior art is shown by way of example in FIG. 3. In order to be able to equalise the large pressure difference between the outside and the cabin interior, hot bleed air under high pressure is withdrawn from a compression stage 12 of a turbine power unit (not shown) and fed to the air-conditioning system 10. For this purpose the bleed air is inter alia fed via various bleed air line sections 20, 22, 26, 30 and a main regulating valve 16 to an air-conditioning unit 32. There as well as in upstream and downstream individual units (ozone converter 24, valves, compressor, turbine, etc.) the bleed air is basically treated so that its physical properties (temperature, pressure, water content) are brought into desired ranges so as to be able to use the bleed air as fresh cabin air. In order to limit the required amount of bleed air and thereby avoid an unnecessary power consumption, part of the cabin air is retreated and mixed with the fresh cabin air. The air-conditioning system 10 is designed overall so that two mutually independent air-conditioning units 32, 32a supply the consumer sites within the aircraft cabin. In this way, with an appropriate over-dimensioning of the air-conditioning units and the associated individual components, a certain redundancy and thus an increased security can be achieved.

An important individual component of the air-conditioning system is the main regulating valve 16 ("FCV=flow control valve"), which when controlled by a regulating computer on the basis of various system measurement quantities, influences the mass air flow fed to the air-conditioning unit 32. For this purpose a movable throttle valve is arranged in the flow channel of the main regulating valve unit, with the aid of which valve the mass air flow derived from the bleed air source can be reduced to the required amount. Apart from regulating the mass flow, the main regulating valve 16 can also be used to interrupt completely the withdrawal of bleed air from the compressor stage by closing the throttle valve, so as to be able to provide the maximum available output in the turbine power unit. For example, this is routinely carried out before start-up of an aircraft equipped with such an air-conditioning system 10, so as to be able to ensure the maximum thrust of the power unit during the start-up procedure. After closing the throttle valve of the main regulating valve 16, fresh cabin air may however also no longer be available. When a certain flying height is reached (for example 1,500 feet—457.2 meters) the main regulating valve 16 is then re-opened so that the air-conditioning unit 32 can resume operation.

On account of the high temperature of the bleed air the main regulating valve is exposed to a high thermal stress. At the same time, as with any structural part in aviation technology there is the need to use lightweight construction techniques in order to be able to keep the overall weight of an aircraft as low as possible. Consequently the situation repeatedly arises that a main regulating valve that is closed before start-up can no longer open once the flying height appropriate to the opening of the valve is reached. This may be caused for example by a jamming of the throttle valve, but also by electrical malfunctions. Since in the event of a failure of one of the main regulating valves the whole part of the air-conditioning system located downstream of this main regulating valve, in other words in particular also the corresponding air-conditioning unit, essentially becomes non-functioning, the remaining redundant part of the air-conditioning system has to take over the functions of the malfunctioning part. An additional malfunction in the now no longer redundantly secured part of the air-conditioning system can in the worst case scenario lead to a decompression of the aircraft cabin, which requires the immediate implementation of an emergency descent in order to restore the pressure in the cabin to conditions tolerable for the passengers. Especially with long-haul flights over water, over the poles or over largely uninhabited land such malfunctions of the main regulating valves represent a considerable risk. An aggravating factor is that these main regulating valves are installed in an unpressurized part of the aircraft and are thus not accessible for repair during the flight. Apart from the risk that such malfunctions present for the passengers and the crew, these incidents are also not inconsiderable as regards the reputation of an airline, a type of aircraft or an aircraft manufacturer. Thus, for example, the availability of an aircraft before start-up (the so-called "dispatch reliability") can also suffer in the event of a malfunction of the main regulating valves since, as described above, a failure of the latter is classed as a serious fault.

In printed specification U.S. Pat. No. 5,086,622 it is proposed in the event of a pressure drop in the bleed air supply to shut off parts of the air-conditioning system by means of a valve control unit. In this way, although the cabin pressure can of course possibly be maintained by a lower initial pressure, since however individual important components of the air-conditioning system have failed, the air to be supplied to the cabin is no longer sufficiently treated, which is unacceptable for example with a long-haul flight.

Printed specification U.S. Pat. No. 6,189,324 likewise describes an air-conditioning system for aircraft that operates with bleed air. In the event of a malfunction, in this system the bleed air feed to the air-conditioning unit can be closed and the bleed air can be fed directly to the aircraft cabin, possibly at a reduced pressure. This solution too does not provide a more extensive conditioning of the cabin air in such a case and likewise therefore can only be used for emergency cases over a short period.

The printed specification DE 10 2004 101 366 A1 describes a system for providing compressed air in aircraft. The basic concept of this system is to integrate the system heat exchanger required for supplying equipment such as a system for the on-board generation of oxygen (OBOGS=on-board oxygen generation system") or systems with similar compressed air requirements, structurally or functionally in the heat exchanger of the air-conditioning unit. In this connection an embodiment in particular is proposed in which a system heat exchanger and a heat exchanger of the air-conditioning unit are supplied in parallel with compressed air. The compressed air is fed to the heat exchanger of the air-conditioning unit via a regulating valve, and is fed to the system heat exchanger via an "on/off valve". The compressed air outlets of both heat exchangers are connected via a closable line.

Printed specification DE 10 2004 038 860 A1 discloses a system for providing process air, in which in a first cooling system with a first heat exchanger there is integrated a second cooling system with a second heat exchanger.

In printed specification WO 99/24318 A1 an air-conditioning system for aircraft is described, which relates to an improved method for achieving the desired air humidity. In particular the use of two main regulating valves connected in parallel is disclosed.

WO 99/32358 A is directed to a single package cascaded turbine environmental control system. This patent discloses two redundant air cycle machines. However, a heat exchanger (14), a reheater (16) and a water separator (24)—elements necessary for providing conditioned cabin air—each exist only once.

EP 1 439 123 A2 teaches an air-conditioning system for aircrafts. The air-conditioning system comprises two independent redundant air-conditioning system sections. In paragraphs [0061] to [00651] as well as in FIGS. 5 and 7 a line comprising a valve (PXV) is described. The line connects the independent air-conditioning system sections directly downstream of the main regulating valves.

U.S. Pat. No. 2,961,939 A discloses an air-conditioning system for airplanes. In column 3, lines 17 to 21 as well as in FIG. 1 a bypass conduit 26 comprising a bypass valve 27 is described, allowing bypassing of the heat exchanger 24.

An object of the present invention is to provide an air-conditioning system for aircraft that largely avoids the problems mentioned above and at the same time does not significantly increase the complexity of the system.

This object is achieved with the features of the independent claims.

Further embodiments of the invention are described in the dependent claims.

The invention builds on the generic prior art in that a by-pass line comprising a by-pass valve and by-passing at least a part of the bleed air line is provided between the bleed air source and the air-conditioning unit, which by-pass line is designed so that it can be operated to supply the air-conditioning unit with a sufficient mass air flow. In the event of a malfunction in a part of the bleed air line by-passed by the by-pass line and located upstream of the air-conditioning unit—for example in the case of a defective main valve that can no longer open—at least a part of the mass air flow can, by opening the by-pass valve, be fed via the by-pass line. A threatened or already existing failure of the supply of bleed air to the air-conditioning unit can in this way be prevented and compensated by the provision of an alternative supply route. The defect classification of a malfunctioning bleed air line leading to an air-conditioning unit is less, since in particular air-conditioned fresh cabin air at a suitable pressure can furthermore be provided.

In an advantageous embodiment of the invention it is envisaged that the bleed air line has an ozone converter. Should a fault occur in a part of the bleed air line that lies downstream of the ozone converter, then this part of the bleed air line can if necessary be by-passed by the by-pass line and the ozone converter can continue to be used. Furthermore, with a failure or a malfunction of the ozone converter itself and an appropriate routing of the by-pass line, this defect can be ameliorated and at least the operation of the air-conditioning unit can be maintained.

A similarly advantageous embodiment is obtained if the design and construction of the by-pass valve differs from the design and construction of the first valve. This leads to a significantly reduced design-caused malfunction probability of the main valve as well as of the by-pass valve. In particular the design and construction of conventional main regulating valves can also be modified by this measure.

Conventional main regulating valves are as a rule of complex design and structure, offering a purely electrical and a purely pneumatic possibility of control, in order to provide a pneumatic-mechanical regulation of the cabin internal pressure in the event of an electronics malfunction. With the presence of a by-pass valve according to the invention the emergency function of a pneumatic control integrated in the main regulating valve can be taken over by the by-pass valve and thus such a function can be omitted in the main regulating valve, resulting in a lower weight and a lesser complexity of the latter. Furthermore the design and construction of the by-pass valve should as far as possible differ significantly from that of the main regulating valve, in order to achieve as high a systems technology independence as possible of both types of design and thus a lower probability of a simultaneous design-caused malfunction of both valves. Moreover, by adopting a simple type of construction a pressure control can be achieved in an emergency operation, by dimensioning for example the internal cross-section of the by-pass valve relevant to the mass air flow such that the resulting pressure difference with the occurring bleed air pressures generates a suitable cabin internal pressure. Such a type of construction would be noticed simply with a rapidly occurring pressure change of the bleed air pressure in the cabin interior. Alternatively a simple pressure regulation can also be implemented.

Furthermore it may be advantageous if the by-pass valve comprises an attenuation (damping) control. An attenuation control can be achieved for example by means of a time-regulated valve opening procedure and can help to avoid undesirable pressure surges in the by-pass line and connected air-conditioning system components.

In one embodiment according to the invention the by-pass valve may be an on-off valve, in other words it can adopt the states open or closed. Such a simple mode of operation is sensible in particular for components that have to operate principally in emergency situations, and permits a light, reliable and possibly also inexpensive form of construction.

A similarly advantageous embodiment is obtained if the by-pass valve can be controlled via a control unit of the air-conditioning system. Thus, the by-pass line can quickly be opened in the event of a malfunction and the operation of the components located downstream can be maintained.

In a particularly advantageous embodiment it is envisaged that the by-pass line is part of a second air system at least partially independent of the air-conditioning system. This enables already existing air lines of a second air system to be used in the event of a malfunction and reduces the structural expenditure in the implementation of the invention. Depending on the design of the second air system the use of its air lines in the event of a malfunction may not interfere in the regular operation of the second air system or may partly or completely prevent such an operation. If the operation of the second air system is impaired, this defect classification should be such that the classification of the malfunction produced by a failure of one or more air-conditioning units is higher than the one resulting from the impairment of the second air system.

In particular an advantageous modification of the invention is provided if the second air system is a cooled service air system and/or a fuel tank inerting system. Depending on the specific design of the respective systems, then parts of the system, in particular air line sections, valves or the like, can be used while maintaining or interfering in the system operation in order to by-pass the bleed air feed to the air-conditioning unit.

In a likewise advantageous embodiment it may be envisaged that the bleed air source is an auxiliary turbine. If there is insufficient bleed air from the main turbines recourse may thus be had to the auxiliary turbine and its bleed air lines.

The method according to the invention is based on the generic prior art, in that in the event of a defective line capability of the bleed air line, part of the bleed air mass flow is fed via a by-pass line to the air-conditioning unit. In this way the advantages of the invention are also realised within the scope of a method.

The invention is based on the knowledge that a malfunction of a main regulating valve as well as an interruption of the mass flow at an ozone converter upstream of an air-conditioning unit can be largely compensated if a by-pass line is connected between the bleed air source and the associated air-conditioning unit by means of a by-pass valve, via which line the mass air flow can by-pass the defective or flow interrupting element and can supply the air-conditioning unit. In this connection lines already present in the air-conditioning system may advantageously be utilised as part of the by-pass line.

The invention is now described by way of example with the aid of preferred embodiments and with reference to the accompanying drawings, in which.

Figure 1:
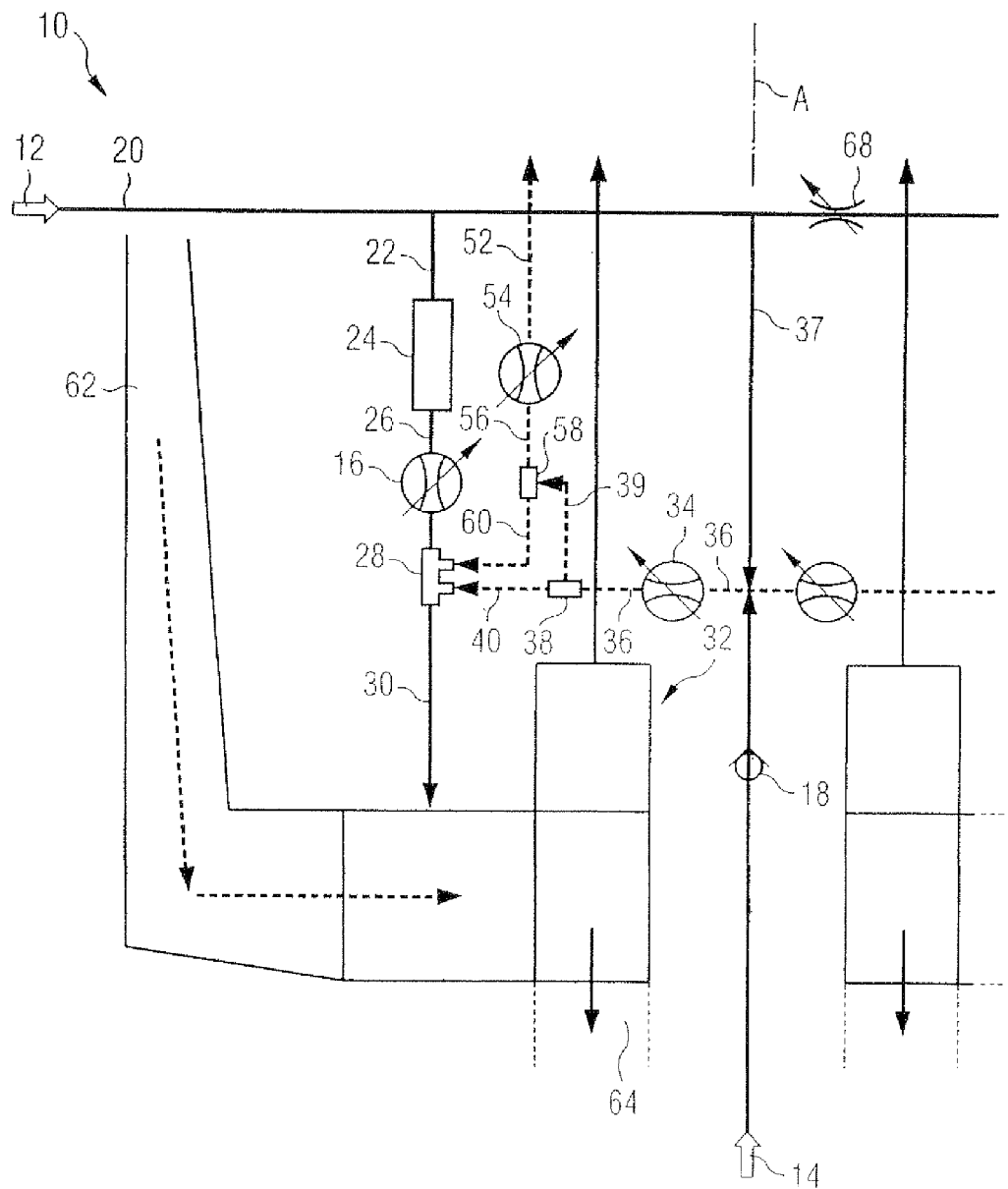
FIG. 1 is a schematic circuit diagram of a first preferred embodiment of an air-conditioning unit according to the invention.

FIG. 1 shows a schematic circuit diagram of a first preferred embodiment of an air-conditioning system 10. The air-conditioning system 10 is designed to be mirror symmetrical along the line A in the wiring diagram, in other words all essential components are present in a doubly redundant manner. Only the part of the air-conditioning system 10 situated on the left-hand side in the respective figure will be described hereinafter, and the identically designed redundant right-hand part is merely referred to in the drawing and is not described in more detail.

Hot bleed air under high pressure is withdrawn from the turbine unit (not shown) via a compressor stage, as illustrated diagrammatically by the bleed air source 12. The withdrawn bleed air is fed via the main bleed air line 20 and a branching bleed air line 22 to an ozone converter 24, from where it passes via a further bleed air line section 26 to a main regulating valve 16 (FCV) and terminates via a T-line section 28 (T-duct) as well as a further bleed air line section 30 in the air-conditioning unit 32 (pack). The air-conditioning unit 32 comprises a ram air inlet 62 as well as a ram air outlet 64. Apart from the just described direct bleed air connection via the bleed air line sections 20-26, the air-conditioning unit 32 is connected starting upstream of the T-line section 28 via a diversion line to the bleed air source 12. The diversion or by-pass line, starting at the T-line section 28 with the by-pass line sections 40, 38, 36, 37, forms a connection between the air-conditioning unit 32 and the main bleed air line 20. A by-pass valve 34 is in this connection provided in the by-pass line section 36. The by-pass valve opens and closes the by-pass line section 36 and is substantially less complex in design than the main regulating valve 16. A simple damping control system can be provided in order to avoid pressure surges. Furthermore, by opening the by-pass valve 34 an air mass flow is in addition ensured for the continuing operation of the corresponding trim-air system, which serves to provide a fine temperature adjustment of the cabin air in the various cabin zones. Optionally, instead of the by-pass line section 40 the connection of the by-pass line 38 can be carried out via trim line sections 58, 60 located between the T-line section 28 and a trim pressure regulating valve 54 (TPRV=Trim Pressure Regulating Valve) by means of a by-pass line section 39, if this is more favourable for the pipework layout. Alternatively or in addition, a line connection can also be provided between the by-pass line system 34-40 and a bleed air source of an auxiliary turbine 14 (APU=Auxiliary Power Unit), which can be connected up by means of an auxiliary turbine check valve 18 (APU check valve).

Under normal operation the hot bleed air under high pressure passes as described above from the bleed air source 12 via the ozone converter 24, as well as being pressure regulated via the main regulating valve 16, to the air-conditioning unit 32. In this unit the bleed air is conditioned, i.e. inter alia is adjusted with respect to pressure, temperature and water content via thermodynamic processes such as pressure increase, cooling and pressure release. In this connection for example ram air via a ram air inlet 62 is used for the cooling. The conditioned air is then passed to the cabin (not shown). A malfunction occurs if at the main regulating valve 16 or at the ozone converter 24 the mass air flow is undesirably interrupted or at least substantially reduced. The resulting pressure drop may first of all lead to a failure of the air-conditioning unit 32. By means of an evaluation of appropriate measurement quantities or automatically by a corresponding construction of the by-pass valve 34, the latter is opened, whereby a direct connection between the bleed air source 12 and the air-conditioning unit 32 is restored. If necessary the cross feed valve 68 separating the independent redundant air-conditioning system sections must be opened. Furthermore, if no or too little bleed air is available from both units, then APU bleed air may be used directly by opening the auxiliary turbine check valve 18. The by-passing of the ozone converter 24 that takes place in such an embodiment may be regarded as less important in view of the thereby avoidable emergency descent otherwise necessary as a result of a pressure loss in the cabin, especially as at flying heights below 31,000 feet (10,121 meters) there are no officially stated figures for the relevant ozone concentrations in the cabin. As an alternative to by-passing the ozone converter 24, a by-pass line could also run in such a way that, starting downstream of the ozone converter 24, it by-passes the main regulating valve 16 and terminates in the T-line section 28, which however may be more difficult to realise on account of possibly very cramped spatial conditions.

Figure 2:
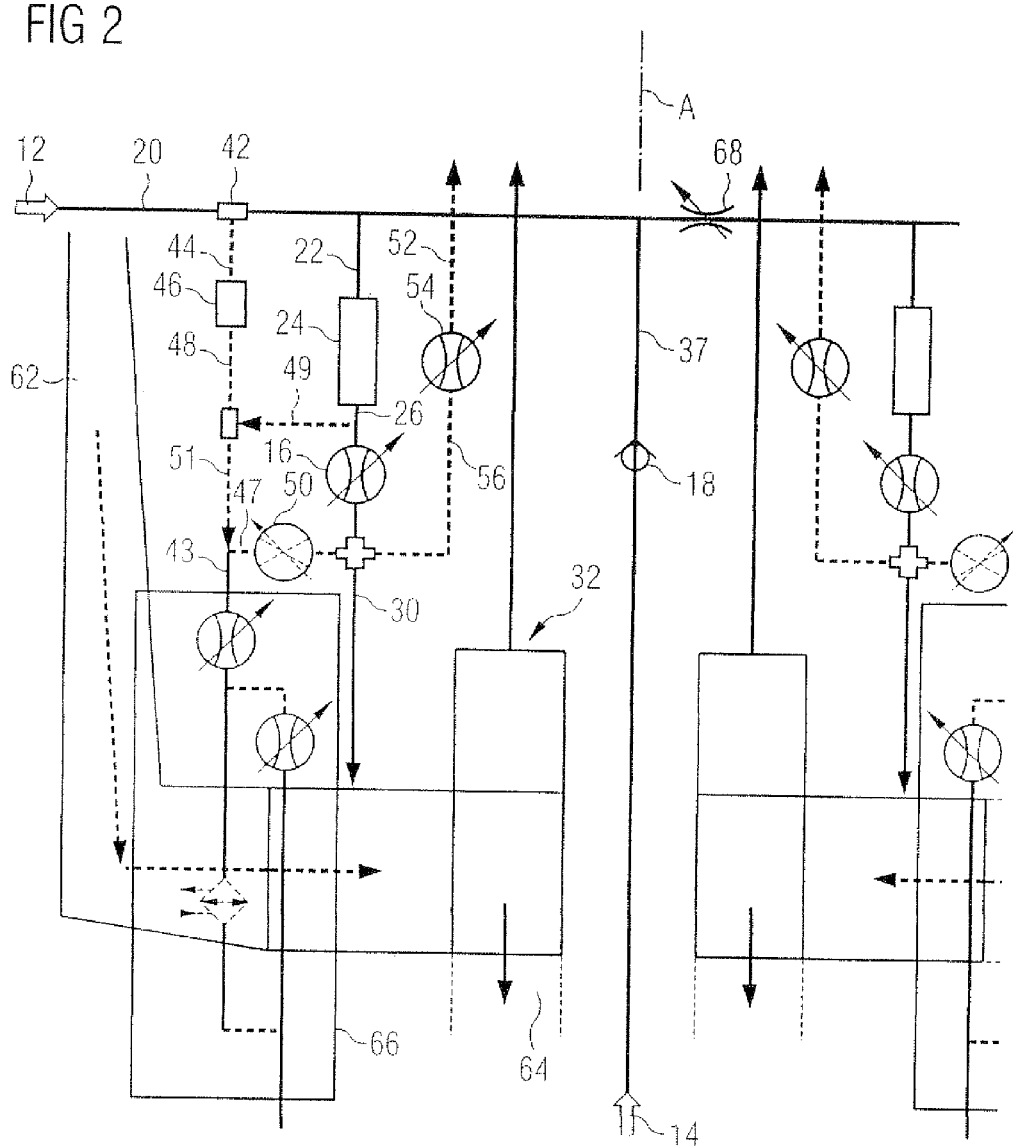
FIG. 2 is a schematic circuit diagram of a second preferred embodiment of an air-conditioning unit according to the invention.
Figure 3:
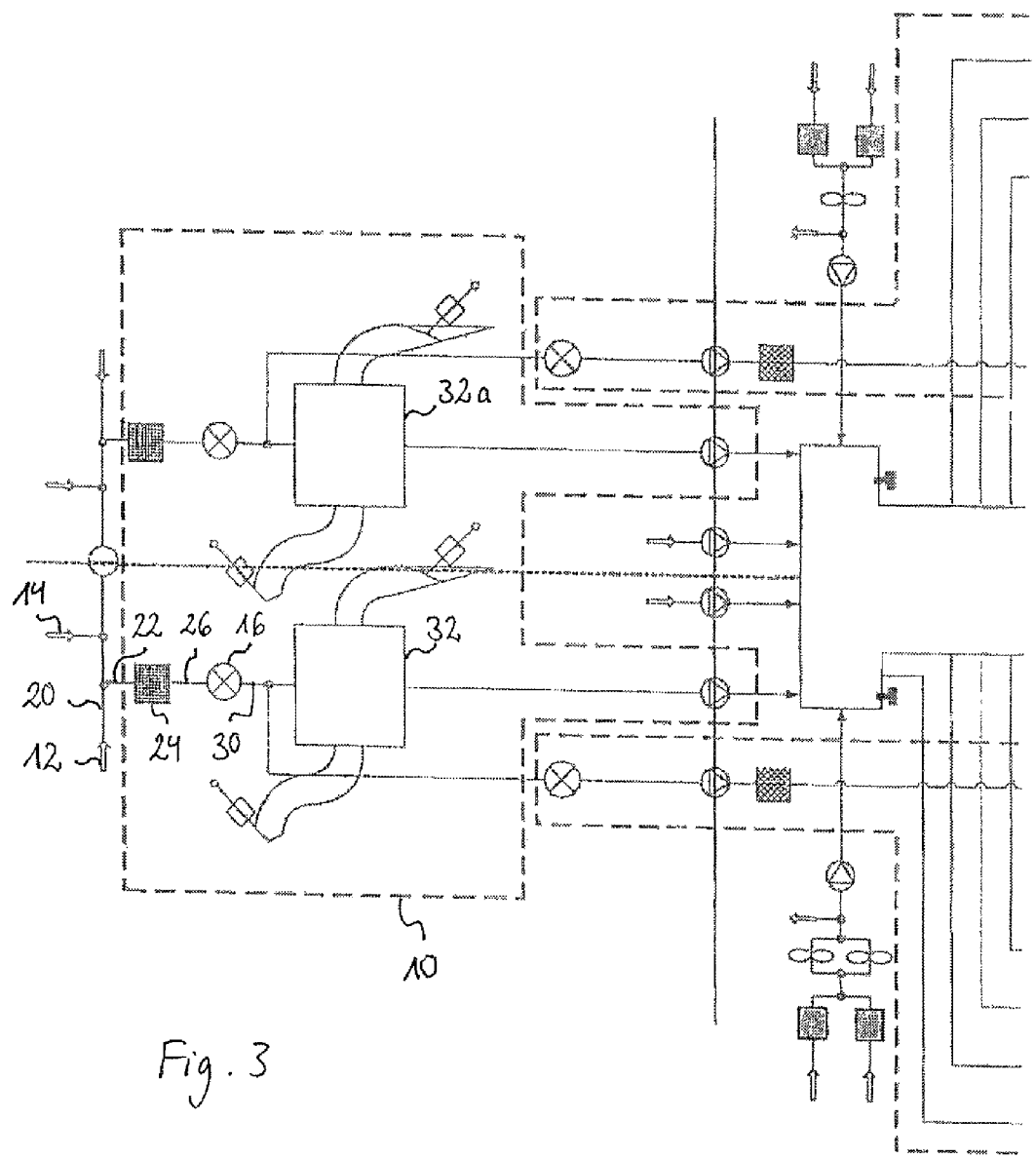
FIG. 3 is a schematic circuit diagram of an air-conditioning system according to the prior art.

FIG. 2 shows a schematic circuit diagram of a second preferred embodiment of the air-conditioning system according to the invention. Since essential parts of this alternative embodiment correspond to the first embodiment, components corresponding to one another are provided with the same reference numerals.

Hereinafter only the differing parts are discussed. In the second preferred embodiment, apart from the air system for supplying the cabin interior, a further system, namely the cooled service air system (CSAS) 66, is illustrated. This is supplied via bleed air lines 42, 43, 44, 48, 51 as well as via an ozone converter 46 with bleed air from the bleed air source 12. In addition a bleed air line 47 with a by-pass valve 50 is provided, via which the bleed air lines 43, 44, 48 of the cooled service air system 66 can be connected to those of the air-conditioning unit 32, in particular to the T-line section 28.

In the event of a malfunction as described above, the cooled service air system 66 is switched off and the by-pass valve 50 is opened. Despite blocked lines 22, 26, a bleed air access to the bleed air source 12 is thereby provided via the by-pass lines 44, 48, 51, 47. A majority of already existing lines of a second air system can thus be used in the event of a malfunction, and simply a by-pass valve 50 and a short pipe section 47 have to be added. The by-pass air may be led through the ozone converter 46 present in the cooled service air system 66, so that the passengers do not have to suffer any inconvenience in this respect. Overall the fault classification of a failure of an air-conditioning unit is reduced from 1 to 2, since the unit can be operated again after opening the by-pass valve. There is consequently no immediate effect on the progress of the flight, since the then switched-off cooled service air system 66 and the downstream connected fuel tank inerting system is designed with a lower reliability. If a CSAS system is not taken into consideration for the by-pass line, in order to guarantee a system independence, then a by-pass line with a by-pass valve may be provided, which starts at the line 26 running downstream from the ozone converter 24 and terminates downstream after the main regulating valve 16, for example in the T-line section 28. Thus, a further combination is provided for by-passing a defective main regulating valve 16 in order to supply the air-conditioning unit 32. At the same time air furthermore flows through the ozone converter 24.

The features of the invention disclosed in the preceding description, in the drawings as well as in the claims may be essential either individually or also in an arbitrary combination for the implementation of the invention.

The invention claimed is:

1. Air-conditioning system (10) for aircraft, in particular for commercial aircraft, with two independent redundant air-conditioning system sections, each section comprising
a tapped air source (12),
a tapped air line (22-30) comprising a main valve (16), and
an air-conditioning unit (32),
wherein a mass air flow conveyed from the tapped air source (12) via the tapped air line (22-30) to the air-conditioning unit (32) can be controlled by means of the main valve (16), characterised in that between the tapped air source (12) and the air-conditioning unit (32) there is provided a by-pass line (36-50, 58, 60) comprising a by-pass valve (34) and by-passing at least a part (22-26, 16) of the tapped air line, the by-pass line (42-50) being part of a second air system that is at least partly independent of the air-conditioning system (10), which by-pass line is designed so that it can be operated to supply the air-conditioning unit with a sufficient mass air flow.

2. Air-conditioning system according to claim 1, characterised in that the tapped air line (22-30) contains an ozone converter (24).

3. Air-conditioning system according to claim 1, characterised in that the design and construction of the by-pass valve (34, 50) differs from that of the first valve (16).

4. Air-conditioning system according to claim 1, characterised in that the by-pass valve (34, 50) comprises a damping control.

5. Air-conditioning system according to claim 1, characterised in that the by-pass valve (34, 50) is an on-off valve.

6. Air-conditioning system according to claim 1, characterised in that the by-pass valve (34, 50) can be controlled by a control unit of the air-conditioning system (10).

7. Air-conditioning system according to claim 1, characterised in that the second air system is a cooled service air system and/or a fuel tank inerting system.

8. Air-conditioning system according to claim 1, characterised in that the tapped air source (12) is an auxiliary turbine (14).

9. Method for air conditioning an aircraft, in particular a commercial aircraft, comprising an air-conditioning system with two independent redundant air-conditioning system comprising the steps:
providing a tapped mass air flow;
passing the tapped mass air flow via a tapped air line to an air-conditioning unit;
passing at least a part of the tapped mass air flow sufficient for supplying the air-conditioning unit to the said air-conditioning unit via a by-pass line in the event of a malfunction of the tapped air line, the by-pass line being part of a second air system that is at least partly independent of the air-conditioning system.

* * * * *

UNITED STATES PATENT AND TRADEMARK OFFICE
CERTIFICATE OF CORRECTION

PATENT NO. : 8,087,255 B2
APPLICATION NO. : 12/295963
DATED : January 3, 2012
INVENTOR(S) : Frank Klimpel It is certified that error appears in the above-identified patent and that said Letters Patent is hereby corrected as shown below:

Column 8, line 35, CLAIM 9, "with two independent redundant air-conditioning system," should read -- with two independent redundant air-conditioning system sections, --

Signed and Sealed this
Twentieth Day of March, 2012

David J. Kappos
*Director of the United States Patent and Trademark Office*